May 16, 1967     J. H. VREELAND ETAL     3,320,529
METHOD FOR TESTING A DIELECTRIC LIQUID
Filed Nov. 28, 1962
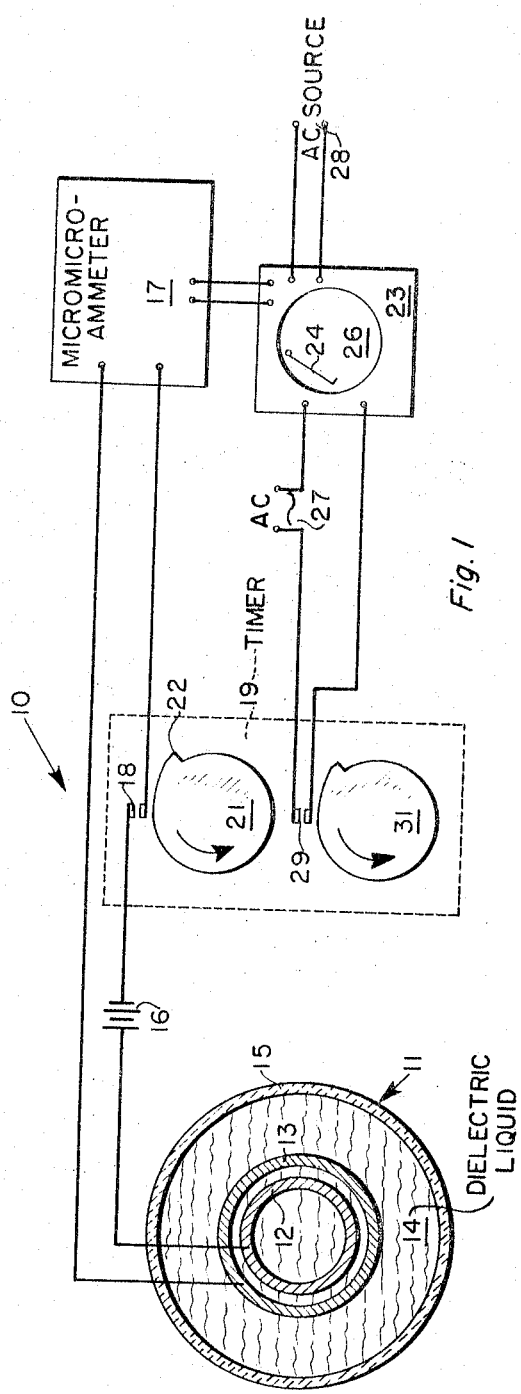
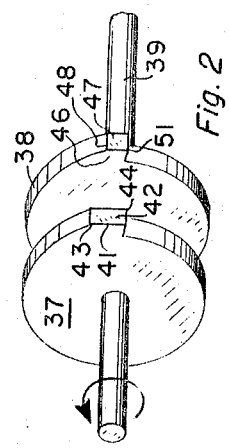
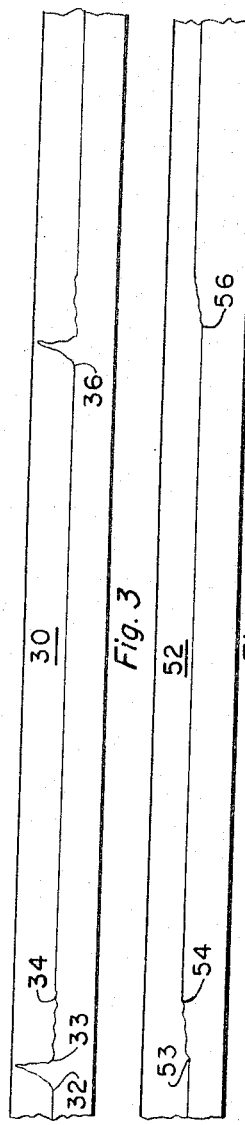
INVENTORS
JAY H. VREELAND
GEORGE FEICK III
BY
*V. F. Volk*
THEIR AGENT

United States Patent Office 3,320,529
Patented May 16, 1967

3,320,529
METHOD FOR TESTING A DIELECTRIC LIQUID
Jay H. Vreeland, Yarmouth, Maine, and George Feick III, Needham, Mass., assignors, by mesne assignments, to Anaconda Wire and Cable Company, a corporation of Delaware
Filed Nov. 28, 1962, Ser. No. 240,645
2 Claims. (Cl. 324—62)

Our invention relates to a method for recording the electrical resistivity of a dielectric liquid and particularly to a method of making a continuing record of said resistivity over a period of time.

In the manufacture of certain liquids such as hydrocarbon oils, silicone oils, and other liquids having very low electrical conductivity when they are free from impurities, the measurement of the electrical conductivity and power factor provides useful means of process control. In a continuous process the measurement should be made on a continuing basis, preferably by automatic devices which provide a record, such as a chart that shows the values of conductivity or power factor versus time. These electrical measurements have particular importance where the liquids in question are intended for use as dielectrics in electrical apparatus, of which cables and transformers are examples. In addition to process control, continuing measurements of power factor may also be required on single specimens of a liquid as a measure of stability or for the purpose of studying changes in the liquid with changing conditions of temperature, electrical stress, etc.

Power factor is an A.-C. phenomenon and the percent power factor of a liquid has the value $$100 \frac{1}{\sqrt{(2\pi fRC)^2 + 1}}$$

where $R$ is the resistance of the liquid between the electrodes of a conductivity cell, $C$ is the capacitance of the cell, and $f$ is the frequency. Since the capacitance of the cell will vary with the dielectric constant of the liquid being tested, the power factor of a liquid is seen to be a function of its resistivity and dielectric constant. For practical testing purposes, however, the dielectric constant may be considered to remain unchanged during processing or testing since any changes that do occur in the dielectric constant are insignificant compared to the very large variations that take place in resistivity. It follows, therefore, that, once the capacitance of a cell has been determined, D.-C. resistance measurements made on that cell will suffice to calculate the power factor of a liquid being tested therein. As a means of determining power factor this method has the advantage that, except for an initial charging current, the small in-phase current does not have to be separated from a capacitative current that may be thousands of times larger such as is the case when power factors are measured with an A.-C. bridge circuit.

In spite of the inherent inaccuracies of A.-C. power factor measurements, D.-C. resistivity determinations have not been used for the calculation of power factors in the past because of cell polarization. Particularly at high impressed D.-C. voltages, polarization has been responsible for false values of resistivity as high as ten times the true value, and it has been generally thought that continuing accurate recording of the resistivity of low conductivity fluids is impossible because of polarization of the cell and the unreliable readings resulting therefrom.

We have, however, discovered a method which may utilize an apparatus for continuingly recording D.-C. resistance measurements on low conductivity liquids with an accuracy so great, that, by the proper calibration of the recording chart, power factors can be automatically plotted directly.

Our apparatus for the continuing periodic measurement of the resistivity of a dielectric liquid comprises a resistivity cell having opposing electrodes and automatic means repeatedly applying a D.-C. voltage across a volume of the liquid between the electrodes for a length of time, preferably not less than about one nor more than about ten seconds, but, in any case, insufficient to cause appreciable polarization of the electrodes, and sufficient to exceed the effects of charging currents. Our apparatus also comprises a micromicroammeter in series with the electrodes and actuated by current flowing through the liquid between them, and recording means actuated by the micromicroammeter.

Preferably our apparatus will include means disengaging the recording means at the termination of the current between the electrodes and also during the flow of charging current.

We have invented the novel method of measuring the resistivity of a dielectric liquid over an extended period of time comprising the steps of repeatedly applying a D.-C. voltage across a pair of electrodes immersed in the liquid for a length of time preferably not less than about one nor more than about ten seconds, but, in any case, insufficient to cause appreciable polarization of the electrodes and sufficient to exceed the effects of charging current, measuring and recording the flow of current between the electrodes during this time, and interrupting the applied D.-C. voltage for a length of time at least several times greater than the time of application.

A more thorough understanding of our invention may be gained from the appended drawing.

In the drawing:

FIGURE 1 is a diagram of the apparatus of our invention.

FIGURE 2 is an enlarged diagram of an element of the timing means in another embodiment of our invention.

FIGURE 3 is a record made by the apparatus of FIGURE 1.

FIGURE 4 is a record made by an apparatus including the element of FIGURE 2.

Referring to FIGURE 1 the apparatus indicated generally by the numeral 10 comprises a conductivity cell 11 in which concentric electrodes 12, 13 are immersed in a glass container 15 containing a liquid 14 to be tested. A battery 16 applies a low D.-C. potential between the electrodes 12, 13. We have found that a battery supplying 2.6 volts is suitable for use with a preferred electrode separation of 0.055 inch. This voltage is much lower than those previously believed to be necessary. For example, ASTM designation D1169–58 "Insulation Resistivity of Electrical Insulating Oils of Petroleum Origin" requires a voltage stress not less than three nor more than thirty volts per mil. This would require a minimum of 165 volts for the particular cell 11 and allow as much as 1650 volts, both of which values greatly exceed the 2.6 volts we have discovered to be sufficient in the apparatus and method of our invention. To measure the current passing through the cell 11 a series connection is made through a micromicroammeter 17. We have found that the micromicroammeter supplied by Keithley Instruments of Cleveland, Ohio, as Model #410, is particularly satisfactory, but other instruments sensitive to currents of the order of $10^{-10}$ amperes are known, and may be used. The battery circuit to the electrodes 12, 13 is connected through a switch 18 which is included within a timer 19 so that it is closed periodically by a cam 21 for lengths of time that are short compared to a full revolution of the cam. The length of time that the switch 18 is closed and a voltage applied across the electrodes 12, 13 is determined by the configuration of a projection 22 on the cam 21. We prefer the projection 22 to be such that it closes the switch 18 for a period of about five seconds every two minutes although this axact timing is not critical. When the switch 18 is closed a current surge occurs to charge the condenser constituting the electrodes 12, 13 and intervening liquid 14. Due to the inertia of the recording system the effects of this surge outlast the current itself. Thus, in order to outlast the effects of charging current and still avoid polarization the voltage should be applied for a period of at least about one second and we prefer a period between about one and ten seconds.

The micromicroammeter 17 has its output potential recorded by a recording potentiometer 23 having a pen 24 making a permanent marking on a chart 26. The drive for the pen 24 is supplied from an A.-C. source 27 independently of a source 28 of power for the chart drive. Current from the source 27 passes through a switch 29 which is operated by a cam 31 of the timer 19 on the same timing as the cam 21 operates the switch 18. Thus the pen 24 does not drop when the switch 18 opens since the pen drive motor ceases to operate at the same time. The results are best understood by reference to FIGURE 3 where a typical chart recording 30 is shown in horizontal form rather than circular. When, due to the simultaneous closing of the switch 18, current flows to charge the condenser formed by the electrodes 12, 13, a surge is indicated starting at a point 32 of the recording 30. Due largely to the inertia of the pen 24, the recording does not return to show the actual flow of current in the cell until a point 33 on the recording. At a point 34 on the recording the cam 21 has opened the switch 18 but the recording does not show a drop in current because the cam 31 has also opened the switch 29 to inactivate the pen drive, so that the pen remains at its last position while the chart 26 continues to rotate, drawing a line up to a point 36 at which the cam 21 again closes the switch 18. The opening of the circuit to the pen drive, so that the pen does not indicate the period of zero current flow, is not merely a convenience for reading the chart. The length of time during which current is applied is so short, being preferably six seconds or less, that if the pen returned to zero each time the cell current was interrupted, the momentum acquired by the pen during the charging surge, or the inertia of the pen in moving into position, would have a masking effect on the true reading. In FIGURE 4 the masking effect has been further reduced by eliminating the surge of the recording pen between the points 32, 33. This is achieved by the cam arrangement shown enlarged in FIGURE 2. Here a cam 37 corresponding to the cam 21 and a cam 38 corresponding to the cam 31 are mounted on a common shaft 39. The cam 37 has a projection 41 identical to the projection 22 of the cam 21 for closing the switch 18. The switch will remain closed while it is contacted by a surface 42 between a point 43 and a point 44 and the duration of current flow through the cell will depend upon the length of the surface 42. The cam 38 also has a projection 46 with a surface 47 for closing the switch 29. But a point 48, at which the switch 29 closes, is advanced so that the switch 29 does not close until about one second after the closing of the switch 18. A point 51 terminating the surface 47 coincides approximately with the point 44 so that both switches open at the same time, as hereinbefore described. By this means the recording pen drive is not energized until after the cessation of the charging current, and the pen behaves in the manner indicated by a chart recording 52 of FIGURE 4 having its time sequence in alignment with the recording 30 of FIGURE 3. Here the switch 29 has been closed by the cam 38 at a point 53, and records the current flow for a few seconds up to a point 54 when both the switches are opened. The pen then remains in position up to a point 56, when the switch 29 again closes. The switch 18 has, of course, already been closed for one second, but the pen has not recorded the surges shown on the recording 30 and, being free from wide fluctuations, has been able to make a more sensitive and accurate recording. As has hereinbefore been explained the records 30, 52 can be calibrated in terms of power factor instead of resistivity by taking into consideration the previously determined dielectric constant of the liquid 14 at the desired temperature.

It will be understood that the cam means described herein for disengaging the pen drive is illustrative rather than limiting and that other means may be employed within the scope of our invention.

We have invented a new and useful apparatus and method for making and recording electrical measurements for which we desire an award of Letters Patent.

We claim:

1. The method of measuring the resistivity of a dielectric liquid over an extended period of time comprising the steps of repeatedly:
    (A) applying a D.-C. voltage across a pair of electrodes immersed in said liquid for a length of time, in seconds,
        (a) not less than about 1, nor
        (b) more than about 10,
    (B) measuring the flow of current between said electrodes during said length of time,
    (C) recording said flow, and
    (D) interrupting said applied D.-C. voltage for a length of time at least several times greater than the length of time of the application of said voltage.

2. The method of measuring the resistivity of a dielectric liquid over an extended period of time comprising the steps of repeatedly:
    (A) applying a D.-C. voltage across a pair of electrodes immersed in said liquid for a length of time,
        (a) insufficient to cause appreciable polarization of said electrodes and
        (b) sufficient to exceed the effects of charging current,
    (B) measuring the flow of current between said electrodes during said length of time,
    (C) recording said flow, and
    (D) interrupting said applied D.-C. voltage for a length of time at least several times greater than the length of time of the application of said voltage.

References Cited by the Examiner

UNITED STATES PATENTS

| | | | |
|---|---|---|---|
| 2,904,996 | 9/1959 | Lamb et al. | 324—65 X |
| 2,928,406 | 3/1960 | Cunniff et al. | 324—30 X |
| 2,985,827 | 5/1961 | Hasenkamp | 324—65 |
| 3,114,613 | 12/1963 | Neitzel et al. | 324—65 X |
| 3,172,037 | 3/1965 | Pfeiffer | 324—30 |

WALTER L. CARLSON, *Primary Examiner.*

FREDERICK M. STRADER, RUDOLPH V. ROLINEC,
*Examiners.*

C. F. ROBERTS, *Assistant Examiner.*